United States Patent
Bhogavilli et al.

(10) Patent No.: US 9,473,530 B2
(45) Date of Patent: Oct. 18, 2016

(54) CLIENT-SIDE ACTIVE VALIDATION FOR MITIGATING DDOS ATTACKS

(71) Applicant: VERISIGN, INC., Reston, VA (US)

(72) Inventors: Suresh Bhogavilli, Gaithersburg, MD (US); Roberto Guimaraes, Fairfax, VA (US); Yujie Zhao, Reston, VA (US)

(73) Assignee: VERISIGN, INC., Reston, VA (US)

( * ) Notice: Subject to any disclaimer, the term of this patent is extended or adjusted under 35 U.S.C. 154(b) by 79 days.

(21) Appl. No.: 14/095,712

(22) Filed: Dec. 3, 2013

(65) Prior Publication Data
US 2014/0096194 A1    Apr. 3, 2014

Related U.S. Application Data

(63) Continuation-in-part of application No. 12/982,520, filed on Dec. 30, 2010.

(51) Int. Cl.
*H04L 29/06* (2006.01)
*G06F 21/55* (2013.01)

(52) U.S. Cl.
CPC ....... *H04L 63/1458* (2013.01); *H04L 63/0236* (2013.01); *H04L 63/10* (2013.01); *H04L 63/1441* (2013.01); *G06F 21/55* (2013.01); *H04L 2463/144* (2013.01)

(58) Field of Classification Search
CPC ........... H04L 63/1441; H04L 63/1458; H04L 63/10; H04L 63/0236
See application file for complete search history.

(56) References Cited

U.S. PATENT DOCUMENTS

| 6,789,203 B1 * | 9/2004 | Belissent | H04L 47/10 370/229 |
|---|---|---|---|
| 6,944,663 B2 | 9/2005 | Schuba et al. | |

(Continued)

FOREIGN PATENT DOCUMENTS

| WO | 2005069732 A2 | 8/2005 |
|---|---|---|
| WO | 2007125402 A2 | 11/2007 |

OTHER PUBLICATIONS

Mudhakar Srivatsa et al., "Mitigating Application-Level Denial of Service Attacks on Web Servers: A Client-Transparent Approach", ACM Transactions on the Web, vol. 2, No. 3, Article 15, Jul. 2008, pp. 1-49.

(Continued)

*Primary Examiner* — Jung Kim
*Assistant Examiner* — Ngoc D Nguyen
(74) *Attorney, Agent, or Firm* — Artegis Law Group, LLP (57) ABSTRACT

Methods and systems for mitigating denial-of-service attacks include a proxy server that monitors a set of application servers configured to receive and service requests from clients. The proxy server intercepts the requests, and in response, provides the clients with customized client-side scripts embedded in markup language. The client-side scripts may include random strings to generate follow-through random uniform resource identifier redirection requests expected by the proxy server. The client-side scripts, upon execution, may challenge the clients by demanding user interaction within a specified period of time, requesting a delay before responding, and/or attempting to set a challenge cookie multiple times. If a client provides the demanded user interaction within the specified time, honors the delay, and/or sets the challenge cookie with the correct value, then the client-side scripts may generate a redirection request expected by the proxy server for that client and the proxy servers may whitelist that client for a configurable duration and forward that client's subsequent requests to the application servers without challenge.

14 Claims, 5 Drawing Sheets

(56) References Cited

U.S. PATENT DOCUMENTS

| | | | |
|---|---|---|---|
| 7,342,929 B2 | | 3/2008 | Bremler-Barr et al. |
| 7,536,552 B2 | * | 5/2009 | Touitou .................. H04L 63/08 713/150 |
| 7,620,733 B1 | | 11/2009 | Tzakikario et al. |
| 7,861,286 B2 | | 12/2010 | M'Raihi et al. |
| 8,346,960 B2 | | 1/2013 | Spatscheck et al. |
| 8,370,940 B2 | | 2/2013 | Holloway et al. |
| 2002/0032869 A1 | | 3/2002 | Lamberton et al. |
| 2003/0229809 A1 | | 12/2003 | Wexler et al. |
| 2004/0143670 A1 | * | 7/2004 | Roychowdhury .. H04L 63/1458 709/229 |
| 2004/0158766 A1 | | 8/2004 | Liccione et al. |
| 2005/0050364 A1 | | 3/2005 | Feng |
| 2005/0235358 A1 | | 10/2005 | Keohane et al. |
| 2005/0256968 A1 | * | 11/2005 | Johnson .................. H04L 67/02 709/232 |
| 2006/0107318 A1 | | 5/2006 | Jeffries et al. |
| 2006/0112176 A1 | | 5/2006 | Liu et al. |
| 2006/0206922 A1 | | 9/2006 | Johnson et al. |
| 2007/0022474 A1 | | 1/2007 | Rowett et al. |
| 2007/0083670 A1 | | 4/2007 | Kelley et al. |
| 2007/0118894 A1 | | 5/2007 | Bhatia |
| 2007/0157300 A1 | | 7/2007 | Sivaradjane et al. |
| 2007/0214505 A1 | | 9/2007 | Stavrou et al. |
| 2007/0266426 A1 | | 11/2007 | Iyengar et al. |
| 2008/0034424 A1 | | 2/2008 | Overcash et al. |
| 2008/0159299 A1 | | 7/2008 | Bu et al. |
| 2009/0144806 A1 | | 6/2009 | Gal et al. |
| 2009/0222561 A1 | * | 9/2009 | George et al. ................ 709/226 |
| 2011/0154472 A1 | | 6/2011 | Anderson et al. |
| 2011/0277027 A1 | | 11/2011 | Hayton et al. |
| 2011/0282908 A1 | | 11/2011 | Fly et al. |
| 2012/0008567 A1 | | 1/2012 | Eisl et al. |
| 2012/0023558 A1 | | 1/2012 | Rafiq |
| 2012/0117222 A1 | | 5/2012 | Holloway et al. |
| 2012/0174196 A1 | | 7/2012 | Bhogavilli et al. |

OTHER PUBLICATIONS

Franck Adkhis (Examiner), Extended European Search Report dated Feb. 10, 2015, European Application No. 14194219.3, filed Nov. 21, 2014, pp. 1-8.

Non-Final Office Action dated May 9, 2014, U.S. Appl. No. 12/982,520, filed Dec. 30, 2010, pp. 1-41.

Angelos Stavrou, "An Overlay for End-to-End Service Availability", Columbia University, ProQuest, UMI Dissertations Publishing, 2007, pp. 1-206.

Myungkeun Yoon, "Using Whitelisting to Mitigate DDoS Attacks on Critical Internet Sites", Communications Magazine, IEEE, Dept. of Electr. Eng. & Comput. Sci., Kookmin Univ., Seoul, South Korea, vol. 48, Issue 7, Jul. 2010, pp. 110-115.

Michael Walfish et al., "DDoS Defense by Offense", SIGCOMM '06 Proceedings of the 2006 Conference on Applications, Technologies, Architectures, and Protocols for Computer Communications, 2006, pp. 303-314.

Harkeerat Singh Bedi et al., "Game Theory-based Defense Mechanisms Against DDoS Attacks on TCP/TCP-friendly Flows", 2011 IEEE Symposium on Computational Intelligence in Cyber Security (CICS), Apr. 11-15, 2011, pp. 129-136.

Tao Peng et al., "Survey of Network-based Defense Mechanisms Countering the DoS and DDos Problems", Journal, ACM Computing Surveys (CSUR) Surveys Homepage archive, vol. 39, Issue 1, 2007, Article No. 3, pp. 1-46.

Non-Final Office Action dated Oct. 3, 2014, U.S. Appl. No. 12/982,520, filed Dec. 30, 2010, pp. 1-43.

International Search Report and Written Opinion dated Jun. 20, 2012, International Application No. PCT/US2011/064328, filed Dec. 12, 2011, pp. 1-20.

Author Unknown, "VeriSign Internet Defense Network Overview", Jun. 1, 2009, pp. 1-4.

Brough Davis, "Leveraging the Load Balancer to Fight DDoS", InfoSec Reading Room, SANS Institute, Jul. 30, 2010, pp. 1-45.

Wang et al., "Wraps: Denial-of-Service Defense through Web Referrals", 25th IEEE Symposium on Reliable Distributed Systems (SRDS '06), 2006, pp. 1-10.

Roger P. Karrer, "EC: an edge-based architecture against DDoS attacks and malware spread", Proceedings of the 20th International Conference on Advanced Information Networking and Applications (AINIA '06), 2006, pp. 1-5.

Author Unknown, Cisco Guard Configuration Guide, Configuring Zone Filters, http://www.cisco.com/en/US/docs/security/anomaly_detction_mitigation/appliances/guard/v5.0/configuration/guide/conffilt.html#wp1135548, retrieved Dec. 30, 2010, pp. 1-15.

Non-Final Office Action dated Jan. 6, 2016, U.S. Appl. No. 12/982,520, pp. 1-45.

* cited by examiner

CLIENT-SIDE ACTIVE VALIDATION FOR MITIGATING DDOS ATTACKS

CROSS-REFERENCE TO RELATED APPLICATIONS

The present Application for Patent is a continuation-in-part of and claims benefit of and priority to U.S. patent application Ser. No. 12/982,520, filed Dec. 30, 2010, entitled "Active Validation for DDOS and SSL DDOS Attacks," pending, and assigned or under obligation of assignment to the same entity as this application and hereby expressly incorporated by reference in its entirety.

FIELD

The present disclosure relates generally to methods and systems for mitigating denial-of-service attacks and other cyber-attacks against servers and web servers.

BACKGROUND

A server is a computer or other electronic device that is configured to provide services or resources to other requesting devices. The server typically provides one or more communication links for receiving communications from other networked devices, known as "clients," and executes one or more processes whose function it is to continually monitor those communication links for incoming messages from clients. In order to service a client request, the server typically must expend system resources, such as memory, processor cycles, or bandwidth. Although the server may elect not to service some clients or client requests, the server must nonetheless devote at least some system resources to receive a client communication and determine whether or not to service it.

In some communications protocols, such as the Transmission Control Protocol ("TCP") and the hypertext transfer protocol ("HTTP"), servers are configured by default to accept and service requests from any client provided the client conforms to the protocol. For example, public-facing web servers are typically configured by default to attempt to service any HTTP request received from any client—for example an HTTP request for a web page—without discriminating between clients or client requests.

Although this characteristic of many communications protocols provides many benefits in terms of readily available network services, it may also leave servers vulnerable to cyber-attacks. For example, in a denial-of-service ("DoS") attack, a client may attempt to overwhelm a server by sending a large number of requests to the server in rapid succession. Because web servers are configured by default to accept requests from all clients, and because the HTTP protocol provides little information about the requesting client that would enable the server to determine the nature of the client's intentions in making the request, the attacked web server may be slow or unable to respond to other, legitimate requests due to the burdens imposed on the server when servicing the flood of requests from the single malicious client.

DoS attacks, however, are often easy to detect and overcome, because, in many cases, all malicious requests from a single attacking client will originate from the same Internet Protocol ("IP") address. Therefore, it may be easy to detect that a server is under attack by simply observing a large increase in traffic over normal loads and that a large percentage of that traffic is associated with a single IP address. The server may then overcome the attack by ignoring all requests from the identified IP address.

Because of the ease with which DoS attacks may be detected and overcome, one variation on the DoS attack is the distributed DoS ("DDoS") attack. In a DDoS attack, rather than having a single client make all of the nuisance requests to the server, the attacker utilizes a network of different clients to simultaneously issue requests to the server. Such a network of requesting clients may be at the attacker's disposal by virtue of an in-place "botnet" in which hundreds or thousands of normal users' computers are infected by malware that is programmed to respond to commands issued by a central machine or authority known as a "bot master." Bot masters may make use of such a collection of "zombie" machines in order to implement a DDoS attack on a server or enterprise.

In a DDoS attack, because the flood of requests may be spread over a large number of disparate clients, each with a different IP address, it may be difficult to detect which requests originate from legitimate clients and which requests originate from malicious clients, such as compromised "zombie" machines in a botnet. Thus, a server may not be able to determine which requests it should ignore and which requests it should service, because all requests may appear substantially identical over the larger pool of IP addresses.

One technique for discerning legitimate requests from malicious requests is to use a client "challenge" mechanism in which each requesting client is challenged to first perform an operation specified by the server before the server commits further resources to servicing the client's request. Frequently, clients that participate in a DDoS attack are programmed to issue requests to the server in a "dumb" fashion—i.e., to perform only the operations necessary to cause the server to allocate resources and bandwidth while minimizing the number of operations that must be performed by the client. For example, when making an HTTP request to a server, a client typically must first construct and transmit the HTTP request and then receive and process the HTTP response from the server. Because the goal of a DDoS attack may be to burden the attacked server as much as possible while minimizing the burden on the attacking clients, the clients may be programmed to simply ignore any HTTP responses transmitted by the attacked server and thus to not devote any resources or processor cycles to processing the responses. Therefore, by requiring clients to perform preliminary tasks to demonstrate that they are normal clients and not merely "dumb" attack scripts, servers may be able to discern legitimate clients from malicious clients.

Conventional client challenge mechanisms, however, suffer from a number of drawbacks. For example, while conventional client challenge mechanisms assess the legitimacy of individual requests, most validations of such requests end up merely confirming whether or not actual browsers were used to originate the requests, as opposed to attack scripts. Therefore, if malicious requests are generated and sent by actual browsers, such as those infected by malware, most conventional mitigation techniques will fail.

There is therefore a need for methods and systems for overcoming these and other problems presented by the prior art.

SUMMARY

Embodiments of the present disclosure relate to systems and methods for mitigating denial-of-service attacks and/or other types of cyber-attacks that attempt to overwhelm a server or a server system. Specifically, a computer-implemented method of mitigating DoS attacks includes intercepting, by a first server system, network requests directed to a second server system, wherein the network requests originate from clients; providing, by the first server system to the clients, responses to the network requests, wherein the responses include embedded client-side scripts that subject the clients to one or more challenge mechanisms requesting the clients to follow through with user interaction; identifying one or more non-suspect clients, the one or more non-suspect clients corresponding to requesting clients that successfully complete the one or more challenge mechanisms; identifying one or more suspect clients, the one or more suspect clients corresponding to requesting clients that do not successfully complete the one or more challenge mechanisms; and forwarding, by the first server system to the second server system, network requests corresponding to the one or more non-suspect clients.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

DETAILED DESCRIPTION

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary embodiments. Electrical, mechanical, logical and structural changes may be made to the exemplary embodiments without departing from the spirit and scope of the present disclosure. The following detailed description is, therefore, not to be taken in a limiting sense and the scope of the present disclosure is defined by the appended claims and their equivalents.

Various embodiments of the present disclosure include systems and methods for mitigating denial-of-service attacks and other cyber-attacks against servers and web servers. An exemplary system according to various embodiments of the present disclosure includes one or more proxy servers monitoring one or more application servers configured to receive and service clients' requests directed to the application servers. The proxy servers may operate as reverse proxy servers and may be transparent to the clients. The proxy servers may intercept the requests, and in response to the intercepted requests, the proxy servers may extract uniform resource identifiers ("URIs") or other resource identifiers from the intercepted requests and determine unique identifiers associated with the clients, such as the clients' Internet Protocol ("IP") addresses and the like. The proxy servers may generate strings of one or more random bytes necessary for the clients to make follow-through random URI redirection requests. The proxy servers may associate the strings of random bytes with the clients' unique identifiers.

After generating the strings of random bytes, the proxy servers may provide the clients with customized client-side scripts embedded in markup language. The client-side scripts may include the strings of random bytes necessary to generate follow-through random URI redirection requests expected by the proxy servers. The proxy servers may obfuscate the strings of random bytes in the client-side scripts to make it difficult to generate the follow-through random URI redirection requests, other than through the supplied client-side scripts. The client-side scripts may also include at least a portion of the URIs extracted from the intercepted requests so that the proxy servers would not have to store the URIs. The client-side scripts, upon execution, challenge the clients by demanding user interaction within a specified period of time. Only after the demanded interaction is taken would the client-side scripts generate the follow-through random URI redirection requests expected by the proxy servers. If a client provides the demanded user interaction within the specified time, then the proxy servers may whitelist the client for a configurable duration, during which the proxy servers forward the whitelisted client's subsequent requests to the application servers without challenge, and provide the client with an original URI redirect to at least one application server originally requested by the client. However, if a client does not provide the demanded user interaction within the specified time, then the proxy servers may drop the intercepted request or service the intercepted request at a lower priority, and blacklist the client for a configurable duration, during which the proxy servers block the blacklisted client's subsequent requests or service the subsequent requests at a lower priority.

Alternatively or in addition, after generating the strings of random bytes, the proxy servers may provide the clients with redirect responses that introduce randomly-set durations of delay. The redirect responses may include the random bytes necessary for the clients to generate follow-through random URI redirection requests expected by the proxy servers. The redirect responses may also include at least a portion of the URIs extracted from the intercepted requests so that the proxy servers would not have to store the URIs. The redirect responses request the clients or the clients' agents (e.g., browsers, applications, and the like) to wait for randomly-set durations of delay before making the follow-through random URI redirect requests. The randomly-set delay durations may vary between the redirect responses. If the proxy server determines that a client has honored a randomly-set delay duration requested of the client, then the proxy servers may whitelist the client for a configurable duration, during which the proxy servers forward the whitelisted client's subsequent requests to the application servers without challenge, and provide the client with an original URI redirect to at least one application server originally requested by the client. However, if the proxy server determines that the client has not honored the randomly-set delay duration requested of the client, then the proxy servers may drop the intercepted request or service the intercepted request at a lower priority, and blacklist the client for a configurable duration, during which the proxy servers block the blacklisted client's subsequent requests or service the subsequent requests at a lower priority.

In various embodiments, the proxy servers may set cookies on the clients and/or read cookies previously set on the clients, and some of the information needed to generate the follow-through random URI redirection requests may come from one or more cookies previously set on the clients. Types of cookies include challenge cookies (for clients that are being challenged), whitelist cookies (for clients that are whitelisted), blacklist cookies (for clients that are blacklisted), and the like. The client-side scripts on their own may not contain all the necessary information to build the requests, which would require an attacker to both hold cookies with the required information as well as perform the necessary manipulations to come up with follow-through random URI redirection requests expected by the proxy servers. Furthermore, some clients may be in networks that sit behind gateways, and thus the source IP addresses in those clients' requests would reflect the IP addresses of the gateways rather than the clients. By using cookies, the proxy servers can uniquely identify clients that sit behind gateways.

The proxy servers may set the same challenge cookies multiple times on clients that are being challenged, to determine the likelihood that the clients are legitimate based on the fact that most legitimate clients (e.g., well-known browsers) validate set-cookie directives but many less sophisticated clients (e.g., botnets) do not. Examples of set-cookie directive validations include expiry validation, domain validation, and the like. When performing expiry validation, a well-known browser would discard any set-cookie directives that attempt to set a cookie with an invalid expiry (e.g., an already-past expiration date/time). When performing domain validation, a well-known browser would discard any set-cookie directives that specify a domain that does not match the requested domain. In various embodiments, subsequent to intercepting at least one request from a client that is not whitelisted or blacklisted, the proxy servers may respond to the request by providing the client with multiple set-cookie directives that attempt to set a challenge cookie with different values, among which one directive sets the correct value while the remaining directive(s) set one or more incorrect values. If the client is able to discard the set-cookie directive(s) with the incorrect values and set the challenge cookie with the correct value, then the proxy servers may determine that the client is legitimate and whitelist the client. Alternatively, if the client sets the challenge cookie with one of the incorrect values, then the proxy servers may determine that the client is malicious or otherwise not legitimate and blacklist the client.

Figure 1:
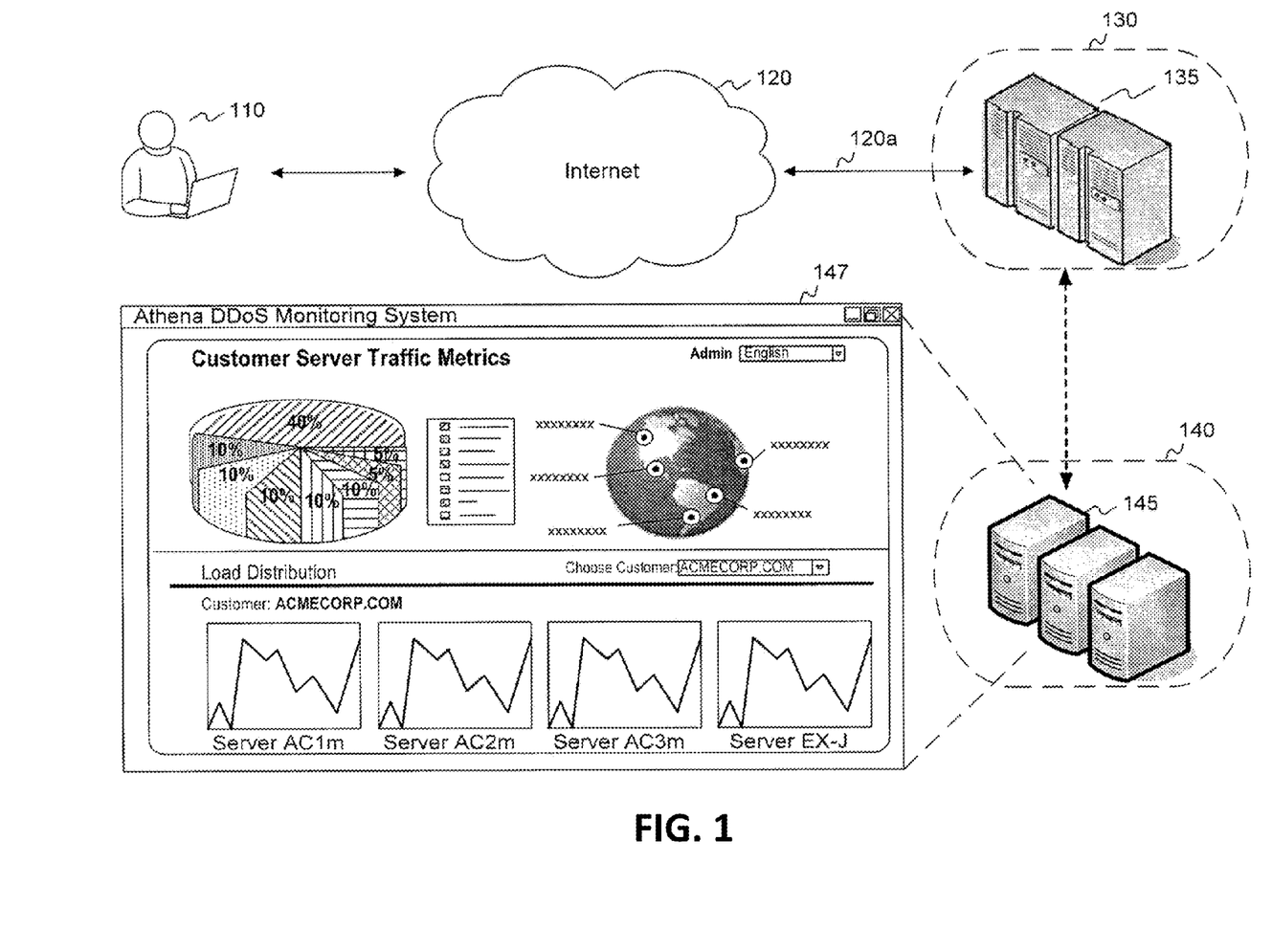
FIG. 1 is a diagram illustrating exemplary communications between application servers and clients, consistent with embodiments of the present disclosure.

FIG. 1 is a diagram illustrating communications between one or more exemplary application servers and one or more clients, consistent with embodiments of the present disclosure. As shown in FIG. 1, one or more application servers 135 of a customer 130 may provide services to one or more end-users or clients 110. Application servers 135 may comprise commercial web servers that service HTTP requests from clients 110 for web pages hosted by the application servers 135. Clients 110 communicate with application servers 135 through the Internet 120 and using normal Internet communications protocols, such as HTTP, TCP/IP, and the like. Although application servers 135 may operate one or more applications or provide one or more public-facing network services, application servers 135 comprise any servers capable of being subjected to a cyber-attack, such as a DoS or a DDoS attack, and need not operate any particular application or host any particular services.

In various embodiments, clients 110 may communicate directly with application servers 135 via Internet 120. For example, HTTP requests from clients 110 may be encapsulated in TCP segments, IP datagrams, and Ethernet frames and transmitted to servers 135 via Internet 120 and a network connection 120a. In some embodiments, the only third-parties that participate as intermediaries in the communication are Internet Service Providers ("ISPs") or other entities that provide routers and link layer switches, which do not analyze or review the contents of the Ethernet frames beyond the link layer and the network layer, but instead analyze only those parts of the packet necessary to route communications from clients 110 to application servers 135.

Application servers 135, or routers providing Internet connectivity to application servers 135, may be monitored by one or more monitoring servers 145. Monitoring servers 145 may monitor application servers 135 for the purpose of determining whether application servers 135 are receiving network communications or are functioning in a normal or expected manner or whether application servers 135 are functioning in a non-normal manner that may indicate the presence of a DoS attack. A "DoS attack" may refer to a traditional DoS attack, in which all malicious requests or communications originate from a single device, a DDoS attack, in which multiple, separate devices may participate in the attack, or other types of cyber-attacks that attempt to overwhelm a server or a server system.

In various embodiments, a third-party mitigation service provider 140 may operate monitoring servers 145, which monitor application servers 135, pursuant to a commercial mitigation service provided to customer 130, which may own or operate application servers 135. Monitoring servers 145 may provide a monitoring dashboard 147, through which customer 130 or an administrator can monitor traffic metrics, load distribution, and/or other information associated with application servers 135. Although FIG. 1 depicts monitoring servers 145 as communicating with application servers 135 using a direct communications link or a communications link separate from Internet 120, those skilled in the art will appreciate that monitoring servers 145 may also communicate with application servers 135 via an indirect network connection, such as a network connection through Internet 120. Monitoring servers 145 may be within the network path between clients 110 and application servers 135 or may be outside of the path.

Figure 2:
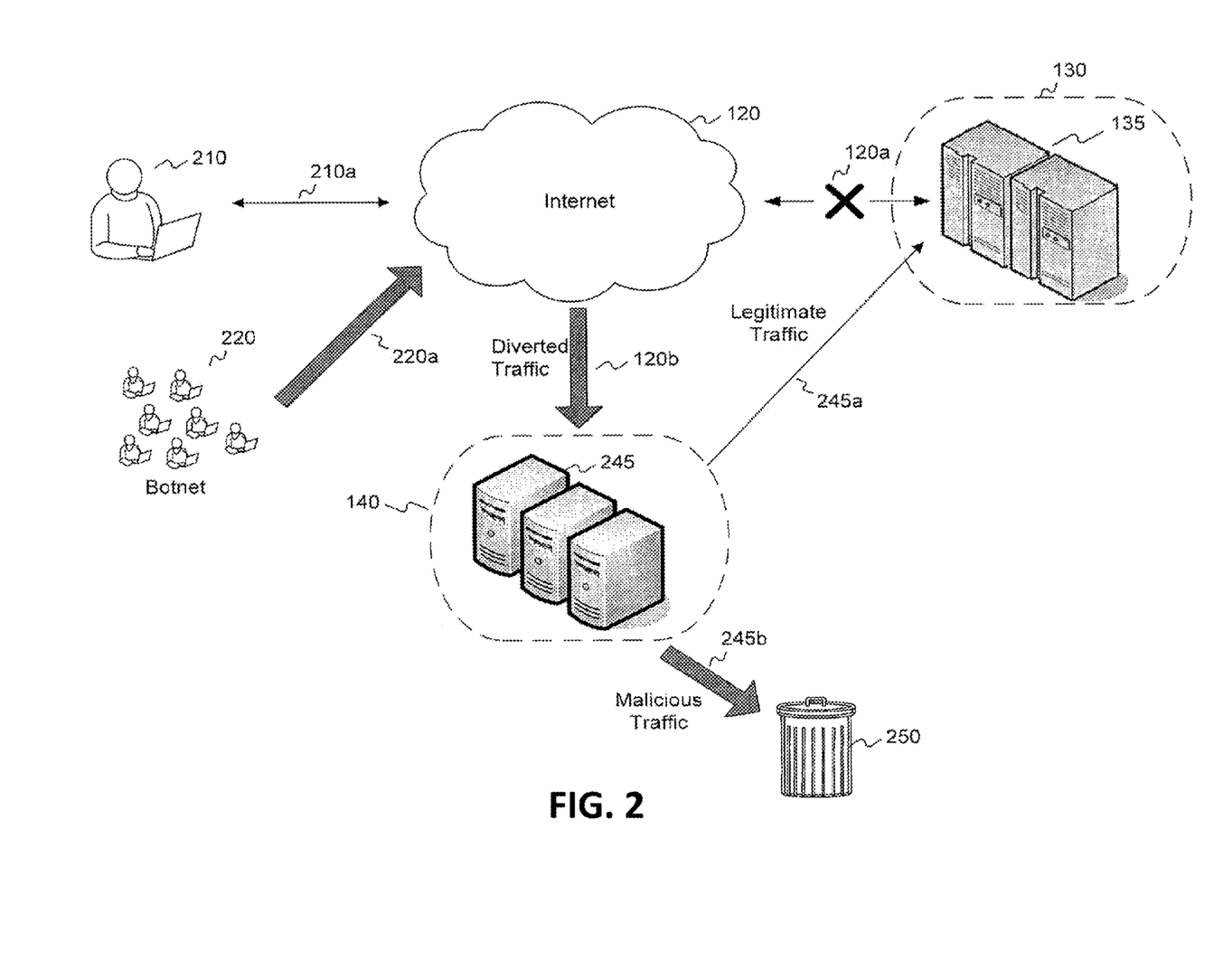
FIG. 2 is diagram illustrating an exemplary method of diverting traffic intended for application servers to a mitigation site in the event of a DoS attack, consistent with embodiments of the present disclosure.

FIG. 2 is a diagram illustrating an exemplary method of diverting network traffic intended for one or more application servers 135 to mitigation service provider 140 for filtering the traffic in the event of a DoS attack, consistent with embodiments of the present disclosure. As shown in FIG. 2, although legitimate clients 210 are making normal requests to application servers 135, additional clients 220 that are part of a botnet are also making requests to application servers 135. In FIG. 2, traffic 220a from malicious clients 220 is depicted as a thick arrow, whereas traffic 210a from legitimate clients 210 is depicted as a thin arrow, to illustrate that traffic 220a may be significantly heavier than traffic 210a. Once a DoS attack on application servers 130 is detected, all traffic 120b to application servers 135 may be diverted to proxy servers 245, such that legitimate clients 210 and malicious clients 220 may no longer be able to establish a direct connection 120a with application servers 135 via Internet 120. In some embodiments, proxy servers 245 may be operated by the same mitigation service provider 140 that operates monitoring servers 145. Moreover, in certain embodiments the same physical servers may perform the roles of both monitoring servers 145 and proxy servers 245. Proxy servers 245 may also be within the network path between clients (e.g., legitimate clients 210 and malicious clients 220) and application servers 135 or may be outside of the path. Proxy servers 245 may operate as reverse proxy servers and may be transparent to the clients.

Traffic 120b may be redirected to proxy servers 245 using a number of different techniques. For example, using features provided by the Border Gateway Protocol ("BGP"), an inter-Autonomous System routing protocol used by ISPs, proxy servers 245 may advertise their availability to route communications to the IP addresses associated with application servers 135 or may advertise that they themselves terminate such IP addresses, in a process known as a "BGP swing." As the result of a BGP swing, communications intended for application servers 135, such as traffic 210a and traffic 220a, may terminate at proxy servers 245 such that proxy servers 245 may communicate with legitimate clients 210 and malicious clients 220 on behalf of application servers 135, typically without detection.

Alternatively, either application servers 135 or proxy servers 245 may initiate a request to one or more Domain Name Service ("DNS") servers to reassign domain names hosted by application servers 135 to IP addresses assigned to proxy servers 245. This process of DNS record alteration may additionally be facilitated or expedited if application servers 135 and/or proxy servers 245, or the entities associated therewith, operate authoritative DNS servers or have other primary or authoritative roles in the DNS system. Those skilled in the art will appreciate that other techniques may be used to redirect traffic intended for application servers 135 to proxy servers 245. Those skilled in the art will also appreciate that the techniques described in this application may also be applied in the context of an "always-on" DDoS attack mitigation service in which proxy servers, such as proxy servers 245, may always be in the communication path between clients and the application servers. In that case, there may be no need to redirect the traffic to the proxy servers when an attack is detected.

After traffic 120b has been diverted to proxy servers 245, proxy servers 245 may filter the traffic by categorizing the traffic into communications from legitimate clients 210 and communications from malicious clients 220, such as DoS participants. All legitimate traffic 245a may be forwarded to application servers 135, while other traffic 245b may be blocked, collected for analysis, and/or discarded (item 250). Alternatively, to avoid denying service to a legitimate client 210 incorrectly identified as malicious, some or all traffic 245b could be forwarded to application servers 135 or otherwise serviced but, for example, at a much lower priority than legitimate traffic 245a, a process known as "rate-limiting."

In some embodiments, proxy servers 245 may be owned or operated by a third-party that provides proxy services as part of a broader DoS attack mitigation service. One advantage of employing a separately-owned or operated mitigation server system may be the third-party service provider's ability to bear computational and connection burdens that a server system of customer 130 could not. For example, customer 130 may be a small company that does not have the resources to operate separate proxy servers to perform mitigation services. Or, even if customer 130 also operates separate proxy servers, such proxy servers might not be able to bear the burden of a full DDoS attack by separately analyzing each requesting client to determine legitimacy. This aspect of invention may be contrasted with conventional systems that focus on equipping servers that are being attacked or other servers operated by the attacked entity to filter legitimate requests from malicious requests. These systems fail when filtering operations themselves are sufficient to overwhelm the owner of the attacked servers or associated proxy servers.

Figure 3:
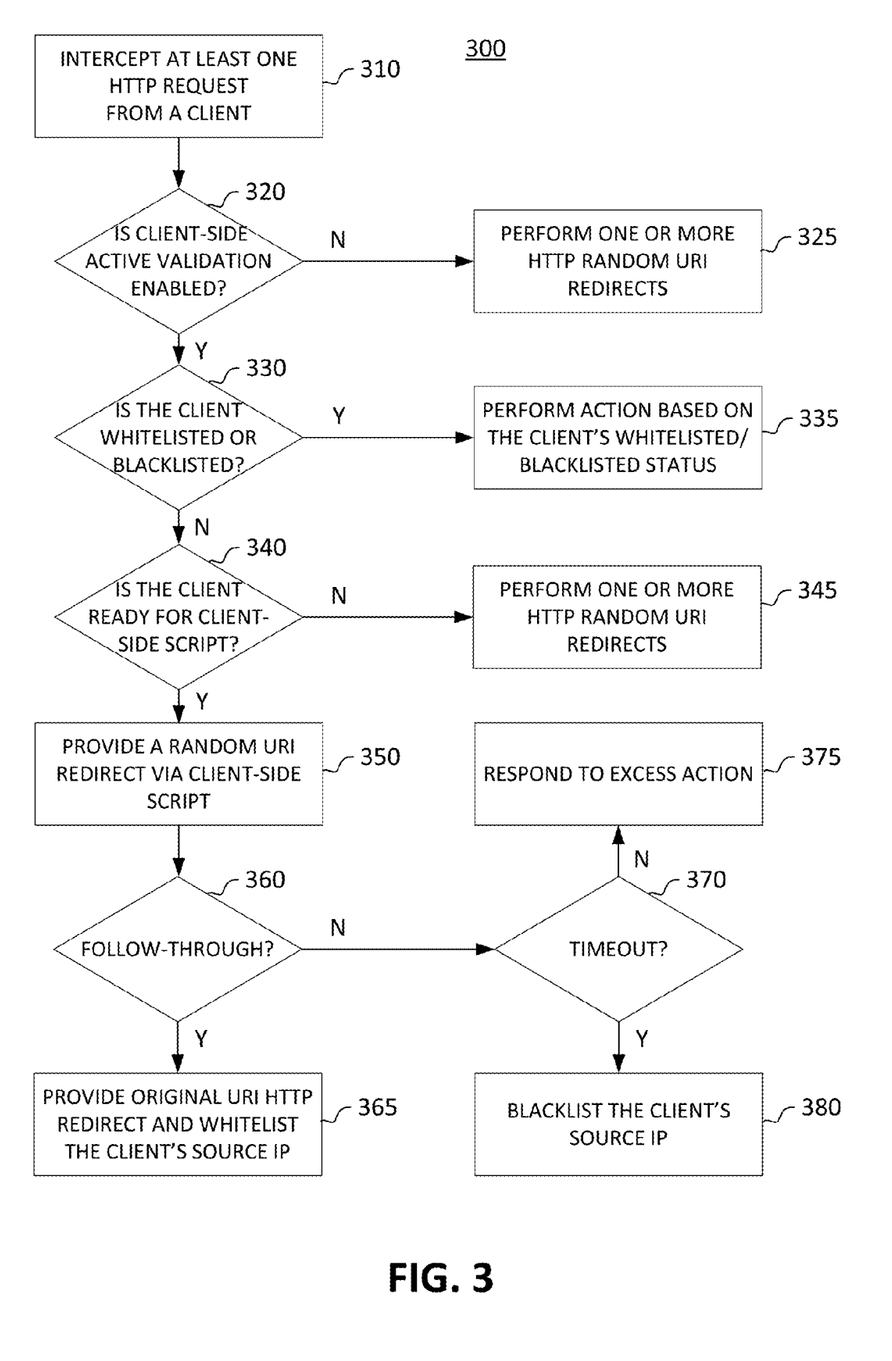
FIGS. 3 and 4 are flow diagrams illustrating example methods for performing client-side active validation against DoS attacks, consistent with embodiments of the present disclosure.

FIG. 3 is a flow diagram illustrating a method 300 for performing client-side active validation against DoS attacks by requiring clients to follow through with demanded user interaction, consistent with embodiments of the present disclosure. In method 300, direct communication between a set of one or more application servers (e.g., application servers 135) and a set of clients (e.g., legitimate clients 210 and/or malicious clients 220) has been disabled. Direct communication between the set of application servers and the set of clients may be disabled due to security policies or in response to a detected or perceived DoS attack. When direct communication is disabled, client traffic is diverted to a set of one or more proxy servers (e.g., proxy servers 245) for the purpose of identifying which of the clients are suspect or malicious and which are non-suspect or legitimate. In particular, FIG. 3 depicts method 300 for performing client-side active validation by challenging clients that have made application-layer requests, e.g., HTTP requests.

In step 310, a proxy server in the set of proxy servers intercepts at least one HTTP request from a client or an agent of the client, such as a browser or an application running on the client. The intercepted HTTP request may be directed to one or more application servers in the set of application servers via, for example, a destination IP address, a port number, a URI, and/or other identifiers associated with the one or more application servers. Next, in step 320, the proxy server may determine whether or not client-side active validation is enabled. If the proxy server determines that client-side active validation is enabled, then method 300 proceeds to step 330. Alternatively, if the proxy server determines that client-side active validation is not enabled, then the proxy server proceeds to step 325 to perform at least one HTTP random URI redirect. If the proxy server determines that the client has successfully performed the HTTP random URI redirect, the proxy server may determine whether or not the client-side active validation has been enabled, and then either subject the client to client-side active validation or forward the intercepted request and whitelist the client for a configurable duration. If the proxy server determines that the client has not successfully performed the HTTP random URI redirect, then the proxy server may block or rate-limit the intercepted request and blacklist the client for a configurable duration.

In step 330, the proxy server may determine whether or not the client has been whitelisted or blacklisted. The proxy server may look up the client's network address (e.g., an IP address), a unique identifier associated with the client, or the like, in a whitelist and/or a blacklist. Alternatively or in addition, the proxy server may attempt to read a status cookie previously set on the client that indicates whether the client is whitelisted or blacklisted.

If the proxy server determines in step 330 that the client is either whitelisted or blacklisted, then method 300 proceeds to step 335 to perform one or more actions based on the client's whitelisted/blacklisted status. For example, if the proxy server determines that the client is whitelisted, then in step 335 the proxy server may, for a configurable duration, forward the intercepted HTTP request and any additional HTTP requests from the client to the set of application servers without requiring client-side active validation; and if the proxy server determines that the client is blacklisted, then in step 335 the proxy server may, for a configurable duration, block or rate-limit the intercepted request and any additional HTTP requests from the client.

However, if in step 330 the proxy server determines that the client is neither whitelisted nor blacklisted, then method 300 proceeds to step 340. In step 340, the proxy server may determine whether or not the client is ready for client-side scripts (e.g., JavaScript, VBScript, or the like) in a response to the intercepted request. For example, if the client requests an image, the client is not likely to expect a response that includes client-side scripts, and is even less likely to execute any client-side scripts included in the response to perform client-side active validation. If in step 340 the proxy server determines that the client is ready for client-side scripts, then method 300 proceeds to step 350. Alternatively, if the proxy server determines that the client is not ready for client-side scripts, then the proxy server proceeds to step 345 to perform at least one HTTP random URI redirect. If the proxy server determines that the client has successfully performed the HTTP random URI redirect, the proxy server may determine whether or not the client-side active validation remains enabled, and then either subject the client to client-side active validation or forward the intercepted request and whitelist the client for a configurable duration. If the proxy server determines that the client has not successfully performed the HTTP random URI redirect, then the proxy server may block or rate-limit the intercepted request and blacklist the client for a configurable duration.

In step 350, the proxy server may provide a response to the intercepted HTTP request and embed one or more customized client-side scripts in the response. The client-side scripts may include one or more strings of random bytes necessary for the client to generate a follow-through random URI redirection request expected by the proxy server. The proxy server may associate the strings of random bytes with the intercepted HTTP request and/or the client. The proxy server may obfuscate the strings of random bytes in the client-side scripts to make it difficult to generate the follow-through random URI redirection request, other than through the client-side scripts provided by the proxy server. The client-side scripts may also include at least a portion of the URI extracted from the intercepted HTTP request so that the proxy server would not have to store the URI. The client-side scripts, upon execution, challenge the client by demanding user interaction within a specified period of time. For example, the client-side scripts, upon execution by the client, may present a popup box to the client demanding user interaction—e.g., requiring a user to click an OK button. Only after the demanded interaction is performed within the specified period of time would the client-side scripts generate the follow-through random URI redirection request expected by the proxy server. The follow-through random URI redirection request may target, or be directed to, a randomized URI that includes the strings of random bytes and the extracted URI. Alternatively or in addition, in step 350, the proxy server may include, in the header of the response to the intercepted HTTP request, one or more directives to set a challenge cookie, as described in greater detail below.

Next, in step 360, the proxy server determines whether or not the client is following through with the demanded user interaction and/or providing the correct value for the challenge cookie previously set on the client. If the client provides the demanded user interaction within the specified time, for example, by sending a follow-through random URI redirection request that targets the randomized URI associated with the intercepted HTTP request or the client and/or includes the correct value stored in the challenge cookie, then in step 365 the proxy server may determine that the client is non-suspect or legitimate and provide the client with an original URI HTTP redirect, which causes the client to make another HTTP request to the application servers sought by the client via the intercepted HTTP request. In step 365, the proxy server may also whitelist the client for a configurable duration, during which the proxy server forwards any subsequent HTTP requests from the client to the application servers without requiring additional client-side active validation.

In step 360, if the proxy server determines that the client has not yet followed through with the demanded user interaction, method 300 may proceed to step 370, during which the proxy server determines whether or not the demanded user interaction has timed out, i.e., whether or not the specified time has passed. If the demanded user interaction has not timed out, in step 375 the proxy server can respond to one or more additional HTTP requests from the client in accordance with a preset or default configuration. For example, the proxy server may pass the additional HTTP requests by forwarding them to the application servers, block and hold the additional HTTP requests pending the result of the client-side active validation, drop the additional HTTP requests, etc. However, if in step 360 the proxy server determines that the demanded user interaction has timed out and/or the client has failed to provide the correct value for the challenge cookie previously set on the client, then method 300 proceeds to step 380, in which the proxy server may determine that the client is suspect or malicious and blacklist the client for a configurable duration, during which the proxy server blocks or rate-limits any subsequent HTTP requests from the client. It will be appreciated that method 300 described herein is illustrative and that variations and modifications are possible. Acts described as sequential can be executed in parallel, order of acts can be varied, and acts can be modified or combined.

Figure 4:
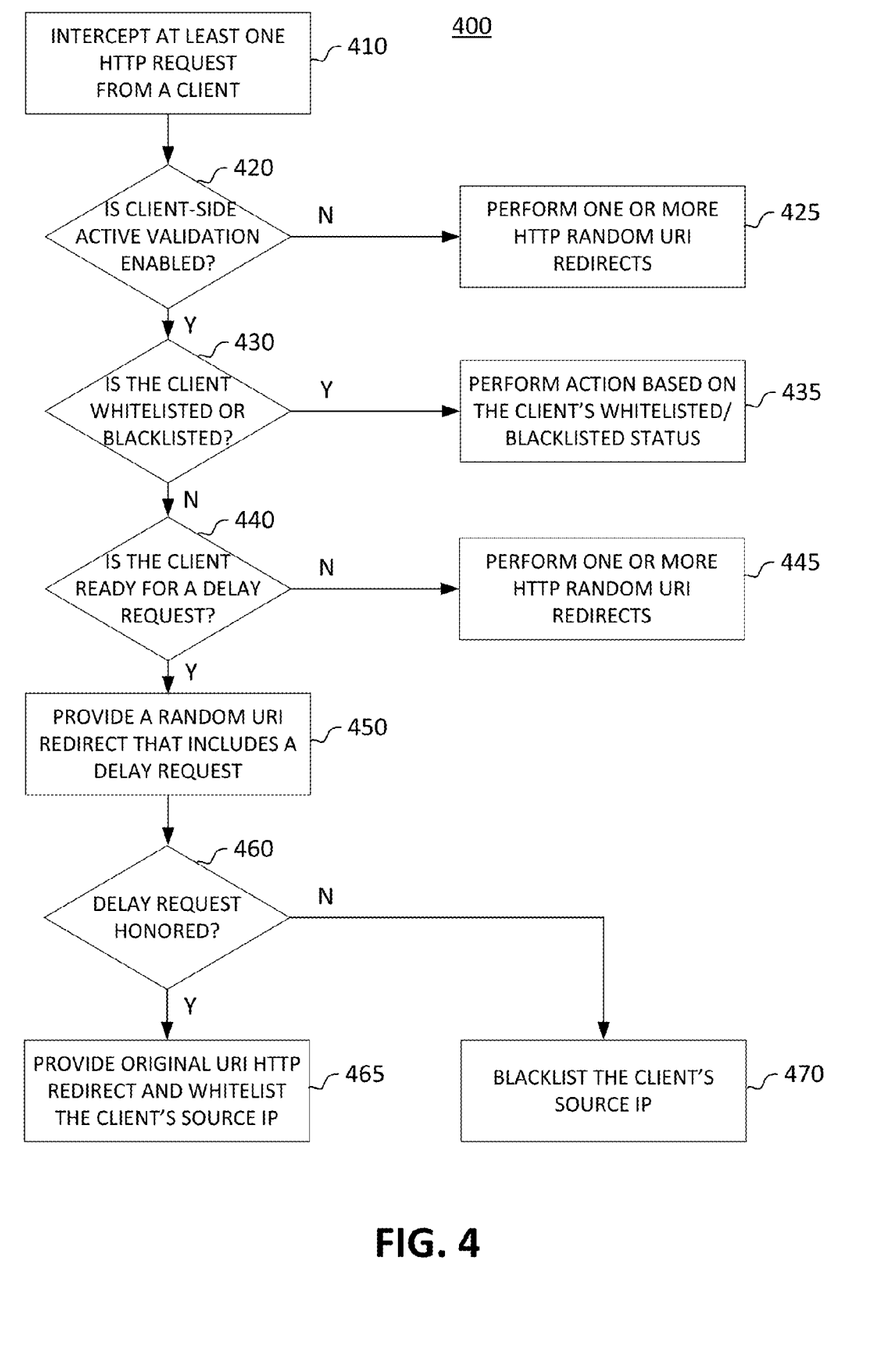

FIG. 4 is a flow diagram illustrating a method 400 for performing client-side active validation against DoS attacks by requiring clients to honor randomly-set durations of delay, consistent with embodiments of the present disclosure. In method 400, direct communication between a set of one or more application servers and a set of clients has been disabled. Direct communication between the set of application servers and the set of clients may be disabled due to security policies or in response to a detected or perceived DoS attack. When direct communication is disabled, client traffic is diverted to a set of one or more proxy servers for the purpose of identifying which of the clients are suspect or malicious and which are non-suspect or legitimate. In particular, FIG. 4 depicts method 400 for performing client-side active validation by challenging clients that have made application-layer requests, e.g., HTTP requests.

In step 410, a proxy server in the set of proxy servers intercepts at least one HTTP request from a client or an agent of the client. The intercepted HTTP request may be directed to one or more application servers in the set of application servers via, for example, a destination IP address, a port number, a URI, and/or other identifiers associated with the one or more application servers. Next, in step 420, the proxy server may determine whether or not client-side active validation is enabled. If the proxy server determines that client-side active validation is enabled, then method 400 proceeds to step 430. Alternatively, if the proxy server determines that client-side active validation is not enabled, then the proxy server proceeds to step 425 to perform at least one HTTP random URI redirect. If the proxy server determines that the client has successfully performed the HTTP random URI redirect, the proxy server may determine whether or not the client-side active validation has been enabled, and then either subject the client to client-side active validation or forward the intercepted request and whitelist the client for a configurable duration. If the proxy server determines that the client has not successfully performed the HTTP random URI redirect, then the proxy server may block or rate-limit the intercepted request and blacklist the client for a configurable duration.

In step 430, the proxy server may determine whether or not the client has been whitelisted or blacklisted. The proxy server may look up the client's network address, a unique identifier associated with the client, or the like, in a whitelist and/or a blacklist. Alternatively or in addition, the proxy server may attempt to read a status cookie previously set on the client that indicates whether the client is whitelisted or blacklisted.

If the proxy server determines in step 430 that the client is either whitelisted or blacklisted, then method 400 proceeds to step 435 to perform one or more actions based on the client's whitelisted/blacklisted status. For example, if the proxy server determines that the client is whitelisted, then in step 435 the proxy server may, for a configurable duration, forward the intercepted HTTP request and any additional HTTP requests from the client to the set of application servers without requiring client-side active validation; and if the proxy server determines that the client is blacklisted, then in step 435 the proxy server may, for a configurable duration, block or rate-limit the intercepted request and any additional HTTP requests from the client.

However, if in step 430 the proxy server determines that the client is neither whitelisted nor blacklisted, then method 400 proceeds to step 440. In step 440, the proxy server may determine whether or not the client is ready for a delay request in a response to the intercepted request. For example, if the client requests an image, the client is not likely to expect a response that includes a delay request, and is even less likely to honor the delay request. If in step 440 the proxy server determines that the client is ready for a delay request, then method 400 proceeds to step 450. Alternatively, if the proxy server determines that the client is not ready for a delay request, then the proxy server proceeds to step 445 to perform at least one HTTP random URI redirect. If the proxy server determines that the client has successfully performed the HTTP random URI redirect, the proxy server may determine whether or not the client-side active validation remains enabled, and then either subject the client to client-side active validation or forward the intercepted request and whitelist the client for a configurable duration. If the proxy server determines that the client has not successfully performed the HTTP random URI redirect, then the proxy server may block or rate-limit the intercepted request and blacklist the client for a configurable duration.

In step 450, the proxy server may provide a response to the intercepted HTTP request and include a delay request in the response. The response may include one or more strings of random bytes necessary for the client to generate a follow-through random URI redirection request expected by the proxy server. The delay request includes a request or instructions for the client to make the follow-through random URI redirection request only after the passage of a randomly-set duration of time, and the proxy server may associate the randomly-set delay duration with the intercepted HTTP request and/or the client. The proxy server may associate the strings of random bytes with the intercepted HTTP request and/or the client. The response may also include at least a portion of the URI extracted from the intercepted HTTP request so that the proxy server would not have to store the URI. In step 450, the proxy server may also include, in the header of the response to the intercepted HTTP request, one or more directives to set a challenge cookie, as described in greater detail below.

Next, in step 460, the proxy server determines whether or not the client has honored the delay request and/or provided the correct value for the challenge cookie previously set on the client. If the client has honored the delay request for the randomly-set delay duration, for example, by sending a follow-through random URI redirection request that includes the strings of random bytes associated with the intercepted HTTP request or the client after the requested delay has elapsed and/or the correct value stored in the challenge cookie, then in step 465 the proxy server may determine that the client is non-suspect or legitimate and provide the client with an original URI HTTP redirect, which causes the client to make another HTTP request to the application servers sought by the client via the intercepted HTTP request. In step 465, the proxy server may also whitelist the client for a configurable duration, during which the proxy server forwards any subsequent HTTP requests from the client to the application servers without requiring additional client-side active validation.

Alternatively, if the proxy server in step 460 determines that the client has not honored the delay request and/or provided the correct value for the challenge cookie previously set on the client, then method 400 may proceed to step 470, in which the proxy server may determine that the client is suspect or malicious and blacklist the client for a configurable duration, during which the proxy server blocks or rate-limit any subsequent HTTP requests from the client. It will be appreciated that method 400 described herein is illustrative and that variations and modifications are possible. Acts described as sequential can be executed in parallel, order of acts can be varied, and acts can be modified or combined.

In various embodiments, during the performance of method 300 as shown in FIG. 3 or method 400 as shown in FIG. 4, the proxy server may set one or more cookies on the client and/or read one or more cookies previously set on the client, and some of the information needed to generate the follow-through random URI redirection request may come from the one or more cookies previously set on the client. Types of cookies include challenge cookies (for clients that are being actively validated), whitelist cookies (for clients that are whitelisted), blacklist cookies (for clients that are blacklisted), and the like. The client-side scripts on their own may not contain all the necessary information to build the request, which would require an attacker to both hold cookies with the required information as well as perform the necessary manipulations to come up with a follow-through random URI redirection request expected by the proxy server. Furthermore, the client may be in a network that sits behind a gateway, and thus the source IP address in the client's request would reflect the IP address of the gateway rather than the client. By using cookies, the proxy server can uniquely identify a client that sits behind a gateway.

In accordance with various embodiments, the proxy server may perform a multiple set-cookie directives challenge via an HTTP response to the intercepted HTTP request to determine the likelihood that the client is legitimate. The proxy server challenges the client by including multiple set-cookie directives in the header of the response, which would set different values to a challenge cookie on the client depending on whether or not the client validates the directives. The proxy server is able to determine the likelihood that the client is legitimate or malicious because most legitimate clients, such as well-known browsers, validate set-cookie directives, but many less-sophisticated clients, such as botnets, do not. Examples of set-cookie directive validations include expiry validation, domain validation, and the like. When performing expiry validation, a legitimate client would likely discard any set-cookie directives that attempt to set a cookie with an invalid expiry (e.g., an already-past expiration date/time). When performing domain validation, a legitimate client would likely discard any set-cookie directives that specify a domain that does not match the requested domain.

Assuming the client is not already whitelisted or blacklisted, the proxy server may respond to the intercepted HTTP request by providing the client with multiple set-cookie directives that attempt to set a challenge cookie with different values, among which one directive sets the correct value while the remaining directive(s) set one or more incorrect values. If the client is able to validate and discard the set-cookie directive(s) with the incorrect values and set the challenge cookie with the correct value, then the proxy server may determine that the client is legitimate and whitelist the client. Alternatively, if the client is unable or unwilling to validate and discard the set-cookie directive(s) with the incorrect values and instead sets the challenge cookie with one of the incorrect values, then the proxy server may determine that the client is malicious or otherwise not legitimate and blacklist the client.

For example, subsequent to intercepting an HTTP request made by a client to "www.test.com", the proxy server may provide an HTTP response that includes three set-cookie directives in the header of the HTTP response for setting a challenge cookie on the client. The first set-cookie directive would set a cookie with an incorrect value, with the domain attribute of the directive properly set to "www.test.com" and the expiry attribute improperly set to an already-past date/time. The second set-cookie directive would set a cookie with the correct value, with the domain attribute of the directive properly set to "www.test.com" and the expiry attribute properly set to a not-yet-past date/time. The third set-cookie directive would set a cookie with an incorrect value, with the domain attribute improperly set to "image.test.com" and with the expiry attribute properly set to a not-yet-past date/time. The client may ignore the set-cookie directives or set the challenge cookie based on one or more of the set-cookie directives. If the proxy server verifies that the client has set the challenge cookie with the correct value, for example, based on the second set-cookie directive, then the proxy server may determine that the client has properly validated the set-cookie directives and thus is likely to be a legitimate client. Alternatively, if the proxy server determines that the client has set the challenge cookie with an incorrect value, for example, based on the first or third set-cookie directive, then the proxy server may determine that the client has failed to properly validate the set-cookie directives and thus is likely to be a malicious client. For instance, a less-sophisticated client (e.g., botnets) may naively set the challenge cookie based on the first set-cookie directive and ignore the second and third set-cookie directives, or may naively set the challenge cookie based on all three set-cookie directives, sequentially re-setting the value of the challenge cookie, and eventually set the value of the challenge cookie based on the third set-cookie directive.

Figure 5:
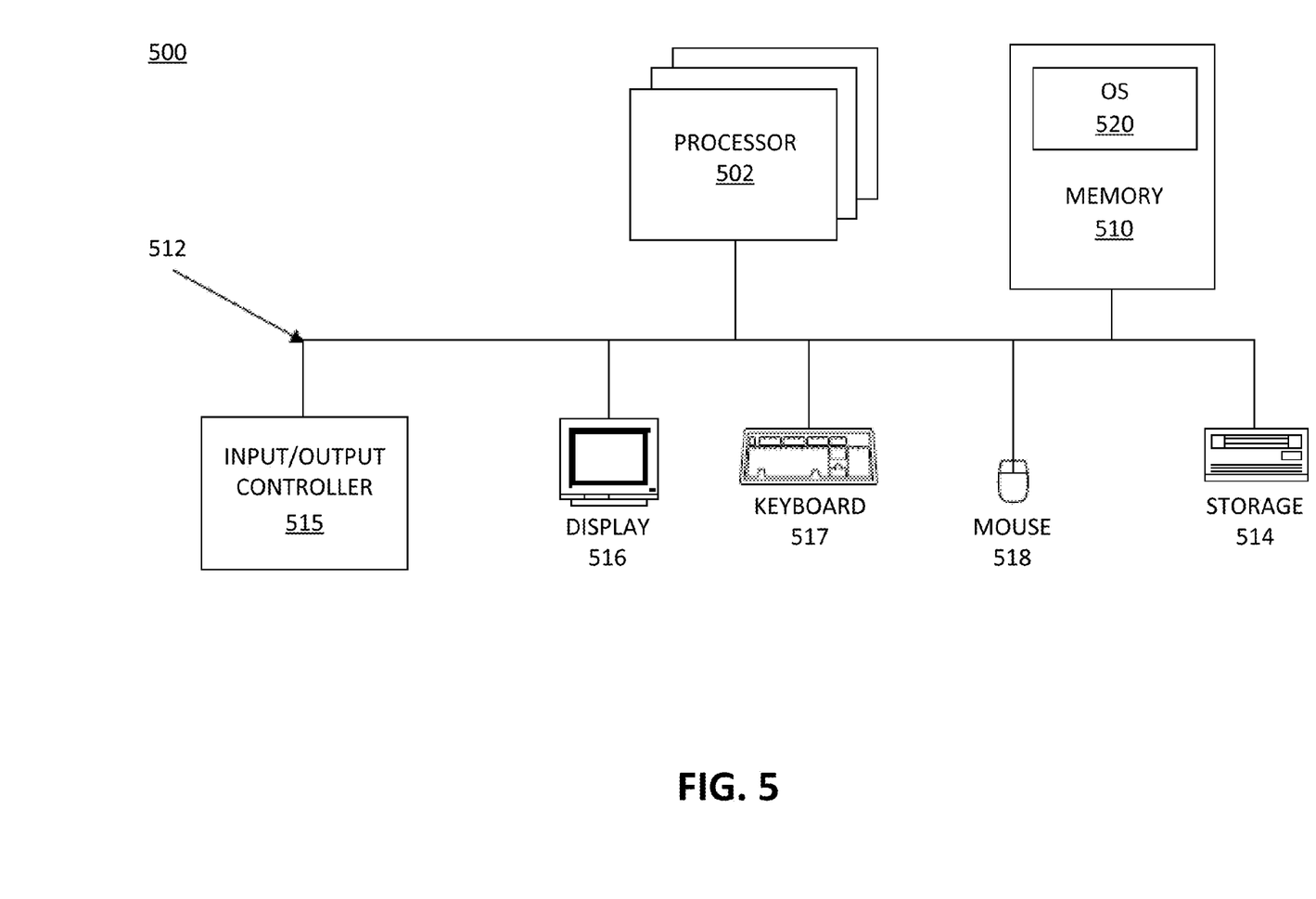
FIG. 5 is an example computer system for performing the disclosed embodiments, consistent with the present disclosure.

FIG. 5 illustrates a computer system 500 that is consistent with embodiments of the present disclosure. In general, embodiments of a proxy server system (e.g., proxy servers 245) in the DoS attack mitigation system may be implemented in various computer systems, such as a personal computer, a server, a workstation, an embedded system, a multifunction device, or a combination thereof. Certain embodiments of the printer driver may be embedded as a computer program. The computer program may exist in a variety of forms both active and inactive. For example, the computer program can exist as software program(s) comprised of program instructions in source code, object code, executable code or other formats; firmware program(s); or hardware description language ("HDL") files. Any of the above can be embodied on a computer readable medium, which include storage devices and signals, in compressed or uncompressed form. However, for purposes of explanation, system 500 is shown as a general purpose computer that is well known to those skilled in the art. Examples of the components that may be included in system 500 will now be described.

As shown, system 500 may include at least one processor 502, a keyboard 517, a pointing device 518 (e.g., a mouse, a touchpad, and the like), a display 516, main memory 510, an input/output controller 515, and a storage device 514. Storage device 514 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 514. System 500 may also be provided with additional input/output devices, such as a printer (not shown). The various components of system 500 communicate through a system bus 512 or similar architecture. In addition, system 500 may include an operating system (OS) 520 that resides in memory 510 during operation. One skilled in the art will recognize that system 500 may include multiple processors 502. For example, system 500 may include multiple copies of the same processor. Alternatively, system 500 may include a heterogeneous mix of various types of processors. For example, system 500 may use one processor as a primary processor and other processors as co-processors. For another example, system 500 may include one or more multi-core processors and one or more single core processors. Thus, system 500 may include any number of execution cores across a set of processors (e.g., processor 502). As to keyboard 517, pointing device 518, and display 516, these components may be implemented using components that are well known to those skilled in the art. One skilled in the art will also recognize that other components and peripherals may be included in system 500.

Main memory 510 serves as a primary storage area of system 500 and holds data that is actively used by applications, such as the printer driver in the barcode printing system, running on processor 502. One skilled in the art will recognize that applications are software programs that each contains a set of computer instructions for instructing system 500 to perform a set of specific tasks during runtime, and that the term "applications" may be used interchangeably with application software, application programs, device drivers, and/or programs in accordance with embodiments of the present teachings. Memory 510 may be implemented as a random access memory or other forms of memory as described below, which are well known to those skilled in the art.

OS 520 is an integrated collection of routines and instructions that are responsible for the direct control and management of hardware in system 500 and system operations. Additionally, OS 520 provides a foundation upon which to run application software and device drivers. For example, OS 520 may perform services, such as resource allocation, scheduling, input/output control, and memory management. OS 520 may be predominantly software, but may also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 502), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A non-transitory computer-readable storage medium including instructions which when executed by a processor within a computer system, causes the processor to execute a method for mitigating denial-of-service (DoS) attacks, the method comprising:

intercepting, by a first server system, network requests directed to a second server system, wherein the network requests originate from clients;

providing, by the first server system to the clients, responses to the network requests, wherein the responses include embedded client-side scripts that subject the clients to one or more challenge mechanisms, and wherein providing further includes:

receiving a first hypertext transfer protocol (HTTP) request from a first client directed to the second server system;

sending, by the first server system to the first client, a response to the first HTTP request, wherein the response includes a plurality of set-cookie directives to set a challenge cookie on the first client, wherein at least one of the plurality of set-cookie directives is valid and configured to set the challenge cookie to a correct value, and wherein at least one of the plurality of set-cookie directives is invalid and configured to set the challenge cookie to an incorrect value;
determining that the first client has set the challenge cookie to the correct value; and
categorizing the first client as non-suspect in response to a determination that the first client has set the challenge cookie to the correct value;
identifying one or more non-suspect clients, the one or more non-suspect clients corresponding to requesting clients that successfully complete the one or more challenge mechanisms;
identifying one or more suspect clients, the one or more suspect clients corresponding to requesting clients that do not successfully complete the one or more challenge mechanisms; and
forwarding, by the first server system to the second server system, network requests corresponding to the one or more non-suspect clients.

2. A system for mitigating denial-of-service (DoS) attacks, comprising:
a processor at a first server system; and
a memory communicatively coupled to the processor, wherein the processor is configured to:
intercept network requests that originate from clients and are directed to a second server system;
provide, to the clients, responses to the network requests, the responses containing embedded client-side scripts that subject the clients to one or more challenge mechanisms, and the processor being further configured to:
receive, from a first client, a first hypertext transfer protocol (HTTP) request that is directed to the second server system;
send to the first client a response to the first HTTP request, the response containing a plurality of set-cookie directives to set a challenge cookie on the first client, wherein at least one of the plurality of set-cookie directives is valid and configured to set the challenge cookie to a correct value, and wherein at least one of the plurality of set-cookie directives is invalid and configured to set the challenge cookie to an incorrect value;
determine that the first client has set the challenge cookie to the correct value; and
categorize the first client as non-suspect in response to a determination that the first client has set the challenge cookie to the correct value;
identify one or more non-suspect clients, the one or more non-suspect clients corresponding to requesting clients that successfully complete the one or more challenge mechanisms;
identify one or more suspect clients, the one or more suspect clients corresponding to requesting clients that do not successfully complete the one or more challenge mechanisms; and
forward, to the second server system, network requests corresponding to the one or more non-suspect clients.

3. The system of claim 2, wherein the processor is further configured to:
receive, from a second client, a second HTTP request that is directed to the second server system and includes a uniform resource identifier (URI);
send to the second client a response to the second HTTP request, the response containing a client-side script with a delay request and a random URI redirect containing a string of random bytes and at least a portion of the URI; and
categorize the second client as non-suspect in response to a determination that the second client has honored the delay request in response to the random URI redirect.

4. The system of claim 3, wherein the random URI redirect directs the second client to make a follow-through HTTP request based on the customized URI particularly associated with the second client by the first server system.

5. The system of claim 2, wherein the processor is further configured to:
whitelist non-suspect clients that successfully complete the one or more challenge mechanisms.

6. A computer-implemented method of mitigating denial-of-service (DoS) attacks, comprising:
intercepting, by a first server system, network requests directed to a second server system, wherein the network requests originate from clients;
providing, by the first server system to the clients, responses to the network requests, wherein the responses include embedded client-side scripts that subject the clients to one or more challenge mechanisms, wherein providing further includes:
receiving a first hypertext transfer protocol (HTTP) request from a first client directed to the second server system;
sending, by the first server system to the first client, a response to the first HTTP request, wherein the response includes a plurality of set-cookie directives to set a challenge cookie on the first client, wherein at least one of the plurality of set-cookie directives is valid and configured to set the challenge cookie to a correct value, and wherein at least one of the plurality of set-cookie directives is invalid and configured to set the challenge cookie to an incorrect value;
determining that the first client has set the challenge cookie to the correct value; and
categorizing the first client as non-suspect in response to a determination that the first client has set the challenge cookie to the correct value;
identifying one or more non-suspect clients, the one or more non-suspect clients corresponding to requesting clients that successfully complete the one or more challenge mechanisms;
identifying one or more suspect clients, the one or more suspect clients corresponding to requesting clients that do not successfully complete the one or more challenge mechanisms; and
forwarding, by the first server system to the second server system, network requests corresponding to the one or more non-suspect clients.

7. The method of claim 6, further comprising:
receiving a second HTTP request from a second client directed to the second server system, wherein the second HTTP request includes a uniform resource identifier (URI);
sending, by the first server system to the second client, a response to the second HTTP request, wherein the response includes a client-side script with a delay request and a random URI redirect containing a string of random bytes and at least a portion of the URI; and
categorizing the second client as non-suspect in response to a determination that the second client has honored the delay request in response to the random URI redirect.

8. The method of claim 7, wherein the random URI redirect causes the second client to make a follow-through HTTP request based on the customized URI particularly associated with the second client by the first server system.

9. The method of claim 7, further comprising:
   obfuscating, by the first server system, the random URI redirect.

10. The method of claim 6, wherein intercepting network requests further comprises:
    redirecting the network requests directed to the second server system to the first server system in response to detecting a DoS attack against the second server system.

11. The method of claim 6, wherein identifying one or more non-suspect clients further comprises:
    whitelisting non-suspect clients that successfully complete the one or more challenge mechanisms.

12. The method of claim 11, further comprising:
    whitelisting non-suspect clients that successfully complete the one or more challenge mechanisms using network addresses associated with the non-suspect clients.

13. The method of claim 11, further comprising:
    whitelisting non-suspect clients that successfully complete one or more challenge mechanisms using at least HTTP cookie values particularly associated with the non-suspect clients.

14. The method of claim 6, wherein forwarding network requests corresponding to the one or more non-suspect clients further comprises:
    discarding network requests corresponding to the suspect clients.

* * * * *